United States Patent [19]
Rubin

[11] Patent Number: 5,160,623
[45] Date of Patent: * Nov. 3, 1992

[54] APPARATUS AND PROCESS FOR FLUID-FLUID CONTACT

[75] Inventor: Jacob N. Rubin, Newton Highlands, Mass.

[73] Assignee: Stone & Webster Engineering Corp., Boston, Mass.

[*] Notice: The portion of the term of this patent subsequent to Dec. 31, 2008 has been disclaimed.

[21] Appl. No.: 759,706

[22] Filed: Sep. 12, 1991

Related U.S. Application Data

[63] Continuation of Ser. No. 663,398, Mar. 25, 1991, abandoned, which is a continuation of Ser. No. 259,791, Oct. 19, 1988, Pat. No. 5,076,930.

[51] Int. Cl.$^5$ .............................................. B01D 11/00
[52] U.S. Cl. .................................... 210/634; 210/197; 210/255; 210/511; 210/195.1; 422/256; 422/258; 422/259
[58] Field of Search ............... 210/255, 511, 634, 322, 210/195.1, 197; 422/256, 258, 259; 196/14.52, 46

[56] References Cited

U.S. PATENT DOCUMENTS

| | | | |
|---|---|---|---|
| 1,297,171 | 3/1919 | Holley et al. | 422/189 |
| 2,016,336 | 10/1935 | Merchant | 196/46 |
| 2,023,546 | 12/1935 | Rummill | 196/46 |
| 2,077,057 | 4/1937 | Poole . | |
| 2,144,797 | 1/1939 | Dono et al. . | |
| 2,405,158 | 8/1946 | Mensing . | |
| 2,729,550 | 1/1956 | Maycock et al. . | |
| 3,374,988 | 3/1968 | Eckert . | |
| 3,784,468 | 1/1974 | Garcia . | |
| 4,292,277 | 9/1981 | Bonney et al. | 422/259 |
| 4,338,285 | 7/1982 | Eberts | 422/257 |
| 4,367,202 | 1/1983 | Fujiwara et al. | 422/258 |
| 4,693,822 | 9/1987 | Bowe et al. | 210/255 |
| 4,753,732 | 6/1988 | Davis et al. | 210/634 |

FOREIGN PATENT DOCUMENTS

| | | |
|---|---|---|
| 854495 | 11/1952 | Fed. Rep. of Germany . |
| 1080522 | 10/1960 | Fed. Rep. of Germany . |
| 2052410 | 4/1972 | Fed. Rep. of Germany . |
| 2159278 | 6/1972 | Fed. Rep. of Germany . |
| 2121199 | 11/1972 | Fed. Rep. of Germany . |
| 2218699 | 11/1973 | Fed. Rep. of Germany . |
| 2527984 | 1/1977 | Fed. Rep. of Germany . |

Primary Examiner—Robert A. Dawson
Assistant Examiner—David Reifsnyder
Attorney, Agent, or Firm—Hedman, Gibson & Costigan

[57] ABSTRACT

A process and apparatus for effecting liquid-liquid contact in a plurality of stages between heavy and light liquid streams is provided wherein said streams are capable of undergoing mass transfer with one another or constituents in either stream are capable of reaction therebetween and where either of said streams can be intercirculated or intracirculated through each stage.

9 Claims, 3 Drawing Sheets

APPARATUS AND PROCESS FOR FLUID-FLUID CONTACT

This is a continuation of application Ser. No. 07/663,398 filed Mar. 25, 1991, now abandoned which is in turn a continuation of application Ser. No. 07/259,791, filed Oct. 19, 1988, U.S. Pat. No. 4,076,930.

FIELD OF INVENTION

The present invention relates to an apparatus and process for carrying out continuous liquid-liquid contacting. In particular, this invention relates to a process for continuously treating or reacting a light liquid stream with a heavy liquid stream or visa versa, wherein said streams are not otherwise miscible or soluble in one another. Further, this invention relates to a process and apparatus for carrying out liquid-liquid contacting in a plurality of stages between a heavy liquid stream and a light liquid stream wherein said streams are capable of undergoing mass transfer with one another or constituents in either stream are capable of reaction.

BACKGROUND OF THE INVENTION

Many processes are known for effecting an intimate mixture between otherwise immiscible fluids of relatively different specific gravities wherein such fluids are reacted or treated with each other. Such mixing is important, for example, to achieve a mass transfer of constituents from the fluid to be treated to the treating fluid.

Such liquid-liquid contacting processes are used extensively in industrial liquid-liquid or solvent extraction processes or in reactions wherein two or more substantially immiscible liquids, typically a hydrophobic organic liquid and an aqueous solution, are mixed together and one or more constituents from one of the liquid phases transfers to another liquid phase or is reacted with a constituent in another liquid phase. After the transfer has taken place, the intimately mixed phases are allowed to separate through a difference in their specific gravities. The mixing-settling process is usually repeated in a plurality of steps with countercurrent flow of the liquids to insure a maximum mass transfer or reaction of constituents therebetween.

A mixing-settling process is described, for example, in U.S. Pat. No. 2,077,057 wherein solvent extraction of mixtures of hydrocarbons is effected by mixing a light and heavy phase material, e.g., a solvent phase and an oil phase, in conjunction with a series of vertical separators having a plurality of baffles or partitions. In like manner, U.S. Pat. No. 2,144,797 describes a process for separating different constituents of oils wherein counterflowing streams of oil and solvent are divided into numerous relatively thin layers by use of multiple alternating baffle plates, said streams flowing rapidly in opposite directions to produce frequent mixing of layers as they move in intersecting paths at relatively high speeds followed by corresponding frequent settling at lower speeds. Further, U.S. Pat. No. 4,292,277 discloses a multistage co- or counter-current liquid extraction process comprising combination mixing-settling chambers having multiple upper and lower settling chambers separated from the mixing chamber by multiple upper and lower baffles. Other examples of such processes employ tray or packed separating towers, multiple-mixer settlers and the like.

Processes such as described above, however, often require significant capital and operating costs due to their elaborate labyrinthine configurations which, as shown, typically require a multitude of chambers and baffles. Further, in solvent extraction applications, such processes usually require large amounts of treating fluids, e.g., aqueous-based liquids, as such process typically do not provide for recycling of treating fluids. This further detracts from the efficiency of such processes as the extracting ability of the treating fluids or the reaction processes of constituents between two fluids cannot be readily optimized due to equilibrium conditions between the fluids to be treated with one another not usually being maximized during such finite contacting times.

SUMMARY OF THE INVENTION

It is therefore an object of this invention to provide a more efficient and less costly process and apparatus for carrying out liquid-liquid contacting of two or more otherwise immiscible or insoluble liquid streams or phases having relatively different specific gravities.

It is a further object of this invention to provide such a process for carrying out liquid-liquid contacting between an aqueous-based stream and a hydrophobic organic stream wherein the organic stream is capable of undergoing mass transfer with the aqueous-based stream, or wherein constituents contained in each stream are capable of undergoing reaction with one another.

To this end, there is provided by the present invention a simple and efficient apparatus and process for carrying out liquid-liquid contact in a plurality of stages between a heavy liquid stream and a light liquid stream, particularly when a light liquid stream is to be treated with a heavy liquid stream, said light liquid stream being capable of undergoing mass transfer with the heavy liquid stream or constituents in each stream are capable of reaction with each other. Accordingly, an apparatus is provided which comprises a first in-line mixing means sufficient for mixing the heavy liquid and light streams so as to form a dispersed liquid phase of globules of one stream dispersed in the other wherein a mass transfer of constituents from one stream to another can take place or where constituents from one stream can react with constituents contained in the other stream, said globules being of an average size such that the dispersed liquid phase is capable of substantially disengaging into two separate layers; a first separating vessel for receiving the dispersed liquid phase effluent from the first in-line mixing means wherein said effluent disengages into a heavier medium of relatively higher specific gravity in the bottom portion of the first separating vessel and into a higher medium of relatively lower specific gravity in the top portion of said vessel; a first conduit means for receiving the bottom effluent from the first separating vessel and supplying said bottom effluent to the first in-line mixing means for recycle and mixing in the manner described above; and a second conduit means for receiving the top effluent from the first separating vessel and supplying said top effluent to at least a second in-line mixing means which is capable of performing in like manner as the first in-line mixing means; a second separating vessel for receiving the dispersed liquid phase effluent from the second in-line mixing means wherein the effluent disengages in the manner set forth above; a third conduit means for receiving the bottom effluent from the second separating vessel and supplying said bottom effluent to the second in-line mixing means for recycle; a fourth conduit means for receiving the bottom effluent from the second separating vessel and supplying said bottom effluent to the first separating vessel for recycle; and a fifth conduit means for receiving the top effluent from the second separating vessel said effluent comprising treated light liquid phase wherein constituents therefrom have been transferred to a heavy liquid phase or reacted with constituents in said heavy phase.

It is further contemplated in the present invention to provide an apparatus particularly suited for effecting liquid-liquid contact in a plurality of stages wherein a light liquid stream is to be treated with a heavy liquid stream. Said apparatus comprises a first in-line mixing means sufficient for receiving and mixing relatively heavy liquid and light liquid streams to form a dispersed liquid phase of globules in the manner described hereinabove; a first separating vessel for receiving dispersed liquid phase effluent from the first in-line mixing means wherein the effluent disengages in the manner set forth above; a first conduit means for receiving the top effluent from the first separating vessel and supplying said top effluent back to the first in-line mixing means for recycle; a second conduit means for receiving the bottom effluent from the first separating means and supplying said bottom effluent to at least a second in-line mixing means capable of performing in the manner described hereinabove; a second separating vessel for receiving the effluent from the second in-line mixing means; a third conduit means for receiving the top effluent from the second separating vessel and supplying said top effluent back to the second in-line mixing means for recycle; a fourth conduit means for receiving the bottom effluent from the second separating vessel comprising the thus treated heavy liquid phase.

If so desired, a plurality of in-line mixing means and separating vessels may be employed in this invention. For example, the fifth conduit means can supply the top or bottom effluent from the second separating vessel to an $N^{th}$ in-line mixing means which is capable of performing in like manner as the first and second in-line mixing means; the effluent from the $N^{th}$ in-line mixing means can then be received by an $N^{th}$ separating vessel which is connected to an $N+1$ conduit means for receiving the bottom or top effuent from the $N^{th}$ separating vessel and supplying said bottom effluent back to the $N^{th}$ in-line mixing means. The $N^{th}$ separating vessel can also be connected to a $N+2$ conduit means for receiving the bottom or top effluent therefrom and supplying said bottom or top effluent to the second separating vessel for recycle. Thus, as will be appreciated by those skilled in the art, the present invention provides both means for intracirculation of a bottom or top effluent from a given separating vessel through a given in-line mixing means, and further means for intercirculation of said bottom or top effluent from the separating vessel to another separating vessel connected in series therewith.

The optimum potential for the mass transfer of constituents or the reaction thereof contained in given heavy liquid and light liquid streams of different specific gravities can, therefore, be easily achieved in practical operation by the present invention by adjusting the recycle route of the bottom or top effluents of a separating vessel such that residence times will thus maximize equilibrium conditions between the intimately mixed streams.

Further, it will be appreciated by those skilled in the art that by intercirculating the bottom or top effluent from a separating vessel to another separating vessel connected in series therewith, as the dispersed phase present in said separating vessel separates and forms a top and bottom effluent typically of lower and higher specific gravities, respectively, a counter-current of streams between separating vessels connected in series can be established between streams of different specific gravities thereby creating a condition of mixing turbulence and intimate mixture of the streams which further contributes to favorable equilibrium conditions for maximum mass transfer or reaction of constituents therebetween.

The apparatus and process of the present invention will be better understood by reference to the following detailed discussion of preferred embodiments and attached FIGURES which illustrate and exemplify such embodiments. It is to be understood, however, that such illustrated embodiments are not intended to restrict the present invention, since many more modifications may be made within the scope of the claims without departing from the spirit thereof.

DETAILED DISCUSSION OF THE PREFERRED EMBODIMENTS

The present invention is applicable to any system of treating one liquid with another or of reacting the constituents contained in one liquid with those contained in the other liquid, wherein the liquids are of different specific gravities. Where the use of a specific liquid is mentioned in this specification, e.g., a preferred embodiment as set forth below, it is not intended that the specification shall be limited by such recitation.

In a preferred embodiment, the invention is particularly suited for use in processes for treatment of petroleum products, for example, in treating a hydrocarbon stream with aqueous sodium on potassium hydroxide or aqueous streams comprising amines to remove impurities such as carbonyl sulfide, mercaptans and the like to very low levels. Such processes for treatment of petroleum products are well known, and involve treatment, for example, of liquefied petroleum gas comprising mainly propane with a lesser amount of butanes and streams comprising lower boiling materials, and light naphtha containing hydrocarbons in the $C_6$-$C_7$ range.

In the process and apparatus of the present invention, wherein a hydrophobic organic stream and an aqueous medium are to be contacted, the organic hydrophobic medium may be lighter or heavier than the aqueous medium. Typically, however, the organic medium is the lighter phase. However, if the hydrophobic organic stream contains a solvent, such as chloroform, which has a specific gravity greater than 1, the organic stream will be the heavier medium.

The following detailed examples are provided to more fully illustrate the present invention by way of preferred embodiments with reference to the accompanying FIGURES.

Figure 1:
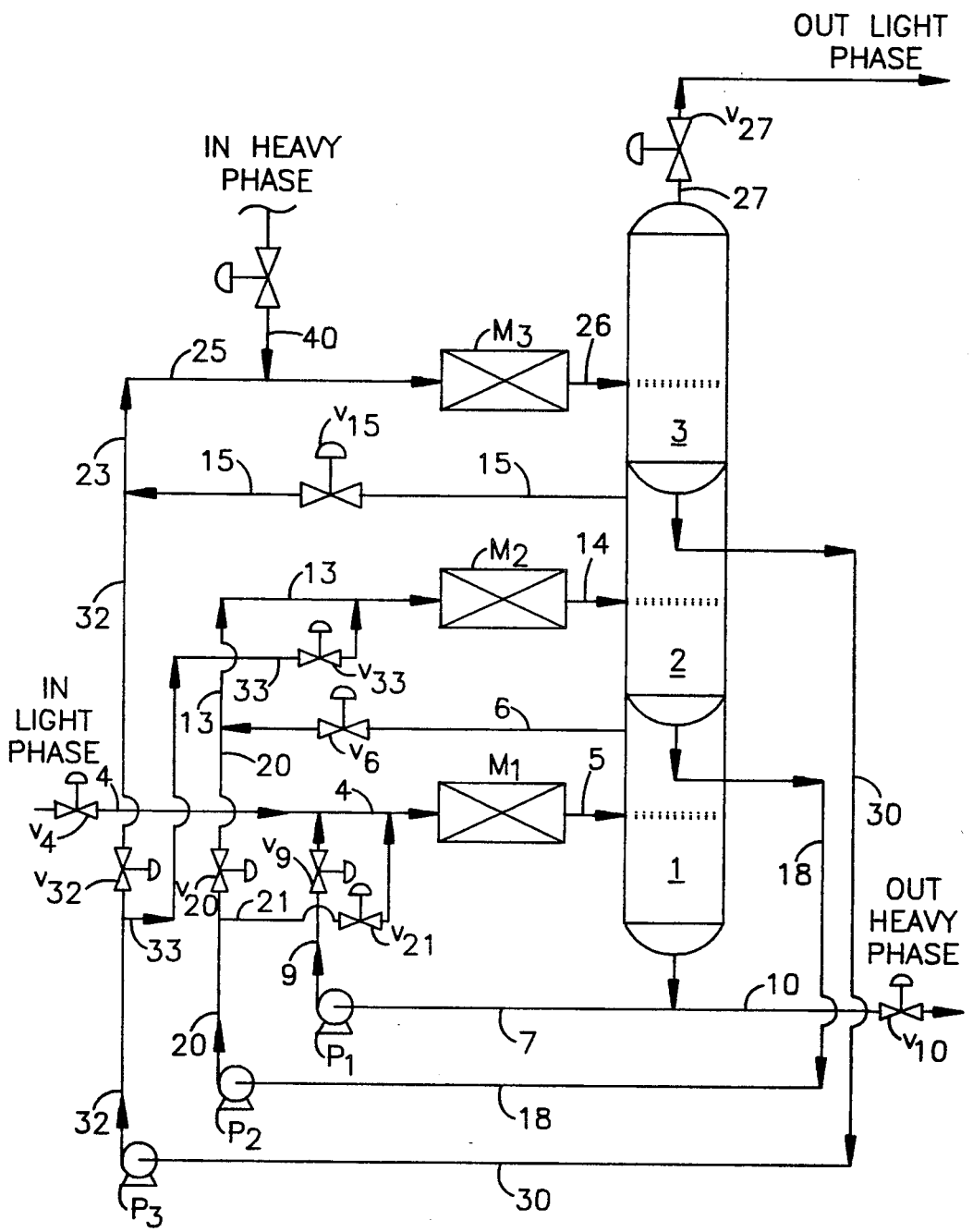
FIG. 1 is a detailed diagrammatic sketch of a preferred embodiment of the apparatus and process of the present invention for treating a light liquid phase with a heavy liquid phase, wherein the heavy liquid phase is capable of both intra- and intercirculation between in-line mixing means-separating vessels connected in series for achieving maximum contact of constituents contained in the respective phases.

Accordingly, the apparatus and process illustrated in FIG. 1 comprises three separating vessels, vessels 1, 2 and 3, for receiving the effluent from three respective in-line mixers, mixers M1, M2 and M3. Separating vessel 1 is provided with a top conduit means inclusive of a valve for receiving the top effluent therefrom and transferring it to in-line mixer $M_2$. Separating vessel 2 is likewise provided with a top conduit means inclusive of a valve for receiving the top effluent therefrom and transferring it to in-line mixer $M_3$. Separating vessel 3 is simply provided with a top conduit means for removing the top effluent therefrom for further treatement in apparatus end processes not shown. Each separating vessel is additionally provided with a bottom conduit means inclusive of a pump, pumps P1, P2 and P3, respectively, which receive the bottom effluent from each respective separating vessel and transfers it back to the respective in-line mixer. Further, bottom conduit means connected to vessel 3 is also provided with valves which can be opened and closed to redirect the flow of bottom effluent therein from separating vessel 3 to additional conduit means for transferring said effluent to in-line mixer $M_2$. Bottom conduit means connected to separating vessel 2 is likewise provided with valves which can be opened and closed to redirect the flow of bottom effluent therein from settling vessel 2 to additional conduit means for transferring said effluent to in-line mixer $M_1$. Lastly, conduit means are provided for receiving liquid light phase and heavy liquid phase streams from sources outside the apparatus.

Referring now to FIG. 1, a hydrocarbon oil (light liquid stream) to be treated enters from outside the process, for example, under gravity head or pump pressure, and passes through conduit 4 into a first in-line mixer $M_1$ wherein it is mixed with a circulating aqueous caustic soda solution (heavy liquid stream) for a time sufficient to produce a dispersed liquid phase of globules of the light liquid stream dispersed in the heavy liquid stream wherein globules of the dispersed phase are preferably from about 100 to 500 micrometers in diameter. The dispersed phase effluent from mixer $M_1$ is then passed through conduit 5 to enter separating vessel 1 at about midway of its height. The dispersed phase is allowed to separate by settling in vessel 1 wherein a light liquid phase stream forms near the top of vessel 1 and exits said vessel under pressure head through conduit 6. A heavy liquid phase stream now containing absorbed sulfur impurities from the light liquid stream settles to the bottom of vessel 1 where it exits said vessel through conduit 7 and is passed to pump $P_1$ from which it is discharged to conduit 9 and passed through valve $V_9$ back to conduit 4 where it is intracirculated back through first in-line mixer $M_1$ for further treatment of incoming hydrocarbon oil through conduit 4. After a determined number of cycles spent caustic solution containing absorbed sulfur impurities can be removed from the process through conduit 10 by opening valve $V_{10}$.

The once treated hydrocarbon oil which exits from the top of vessel 1 through conduit 6 now passes through valve $V_6$ to conduit 13 and thereafter to second in-line mixer $M_2$, wherein it is again mixed with liquid heavy phase caustic solution to produce a dispersed liquid phase comprising dispersed globules having the aforementioned preferred dimensions.

The dispersed phase effluent from mixer $M_2$ is then passed through conduit 14 to enter separating vessel 2 at about midway of its height wherein it is again allowed to separate therein into light liquid phase and a heavy liquid phase streams. The light liquid stream exits separating vessel 2 under pressure head through conduit 15.

The heavy liquid phase stream which settles to the bottom of vessel 2, exits said vessel through conduit 18 and is passed to pump $P_2$ from which it is discharged to conduit 20 and thereafter passed through valve $V_{20}$ in conduit 20 to conduit 13 where it is intracirculated back through second in-line mixer $M_2$ for further treatment of incoming light liquid stream from conduit 6.

Further, the heavy liquid stream which exits vessel 2 through conduit 18 pump $P_2$ can be redirected and intercirculated into vessel 1 by closing valve $V_{20}$ and opening valve $V_{21}$ situated in conduit 21 therein allowing the heavy liquid stream to now pass from conduit 19 through conduit 21 into conduit 4 and thereafter into in-line mixer $M_1$ to be intracirculated therethrough in the manner as described above. It will be appreciated by those skilled in the art that by redirecting and intercirculating the heavy liquid stream effluent from separating vessel 2 to separating vessel 1 as described above, a heavy liquid phase stream can be maintained which flows counter to the rising light liquid stream, thus effecting further mixing and intimate contact of the small globules of light liquid stream hydrocarbon oil with the heavy phase aqueous-based caustic solution to facilitate further mass transport of impurities from the hydrocarbon oil to the treating caustic liquid.

The now twice treated light liquid stream effluent from the top portion of vessel 2 now passes through valve $V_{15}$ in conduit 15 to conduit 25 and then to third in-line mixer $M_3$ wherein it is once again mixed with a heavy liquid aqueous-based caustic solution to produce a dispersed liquid phase comprising dispersed globules having dimensions preferably within the range mentioned hereinabove. The effluent from mixer $M_3$ is then passed through conduit 26 to enter separating vessel 3 at about midway of its height wherein it is once again allowed to separate into light liquid and a heavy liquid phase streams. The light liquid hydrocarbon oil stream exits separation vessel 3 through conduit 27 and valve $V_{27}$, said hydrocarbon oil now being significantly reduced in sulfur impurities and ready for further processing and product development in processes not shown.

The liquid heavy phase caustic solution which settles to the bottom of vessel 3 exits said vessel through conduit 30 and is passed to pump $P_3$ and discharged to conduit 32, passed through valve $V_{32}$ in conduit 32 to conduit 25 wherein it is intracirculated back through third in-line mixer $M_3$ for further treatment of incoming light liquid hydrocarbon oil phase from conduit 23.

Further, the caustic solution which exits separating vessel 3 through conduit 30, pump $P_3$ and conduit 31 can be redirected and intercirculated into separating vessel 2 by closing valve $V_{32}$ and opening valve $V_{33}$ situated in conduit 32, therein allowing heavy liquid phase caustic solution to now pass from conduit 31 through conduit 33, into conduit 13 and in-line mixer $M_2$ to be intracirculated therethrough as many cycles as desired in the manner set forth above, or thereafter be redirected and intercirculated into separating vessel 1, also as set forth above, to further maintain a liquid heavy phase stream flowing counter-directional to the rising light hydrocarbon oil stream, and further effecting mixing and intimate contact of the two liquid streams. The liquid heavy phase can, of course, be intracirculated repeatedly through separating vessel 1 as desired before being removed from the process through conduit 10 and valve $V_{10}$.

The heavy liquid caustic solution can be continuously replenished in the process by entry thereto through conduit 40.

Figure 2:
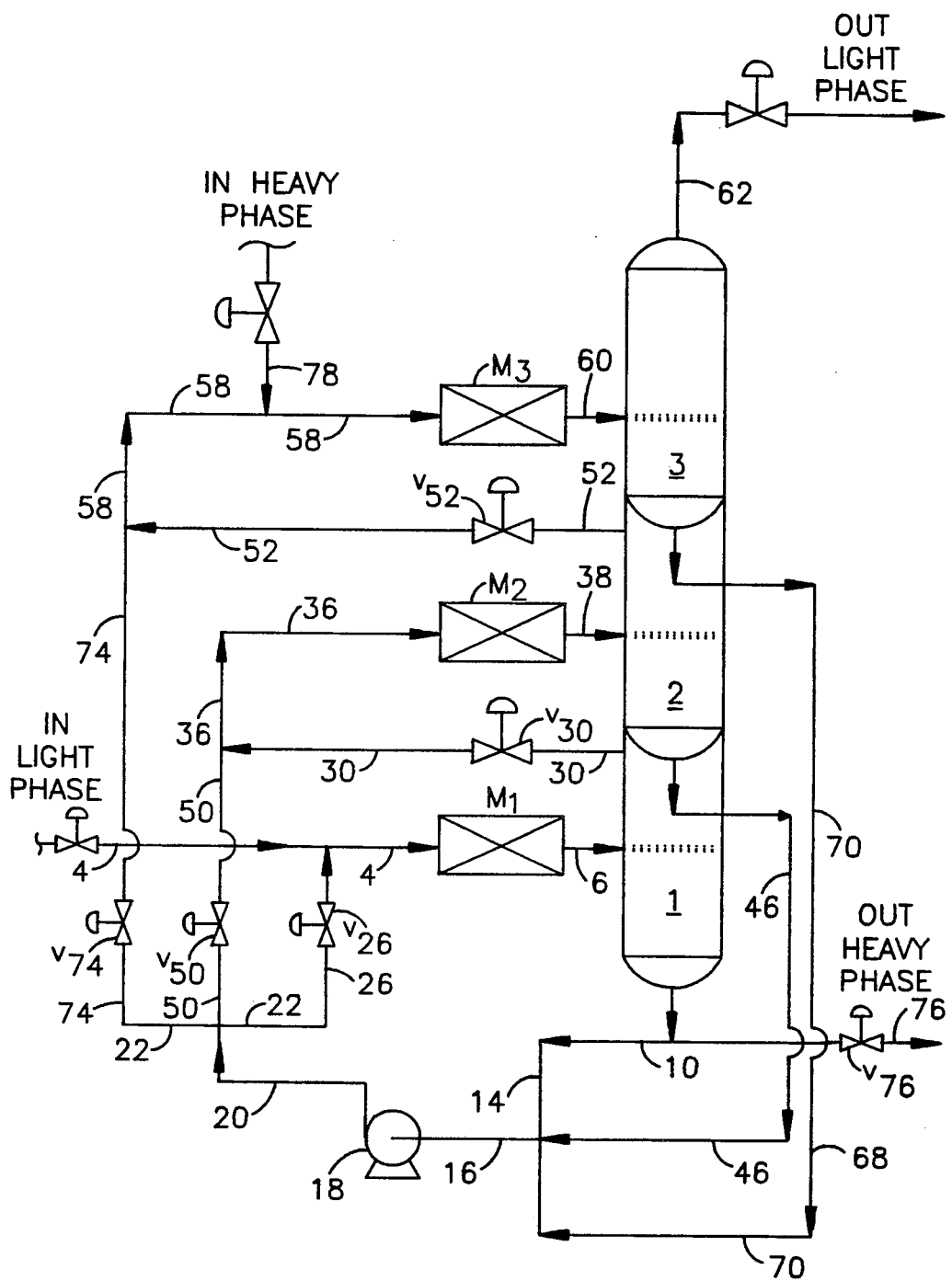
FIG. 2 is a diagrammatic sketch of an additional preferred embodiment of the apparatus and process of the present invention of treating a light liquid phase with a heavy liquid phase wherein the heavy liquid phase is capable of intracirculation to a given in-line mixing means and separating vessel, and is also capable of intercirculation to any one of several additional in-line mixing means and separating vessels connected in series.

The apparatus and process illustrated in FIG. 2 is essentially a modification of that illustrated in FIG. 1 above, wherein a light liquid phase is treated with a heavy liquid phase, and which comprises conduit means for receiving the bottom effluent from respective separating vessels 1, 2 and 3 and providing said effluents to a manifold in flow communication with a central pump means which is also in flow communication with an additional manifold for alternatingly intracirculating said bottom effluents back to respective in-line mixers connected to respective separating vessels, or for intercirculating said bottom effluents to any one of the several in-line mixers provided.

Referring now to FIG. 2, a light liquid stream to be treated enters the process through conduit 4 into a first in-line mixer $M_1$ wherein it is mixed with a circulating heavy liquid stream to produce a dispersed liquid phase in the manner herein provided. The dispersed liquid phase effluent from mixer $M_1$ is the passed through conduit 6 to enter separating vessel 1 wherein said dispersed phase settles and separates into light liquid and heavy liquid phase streams.

A heavy liquid phase stream thus exits separating 1 through conduit 10 situated at the bottom of separating vessel 1 and thereafter is passed to manifold 14 and then to pump means 18 through common conduit 16 which receives the effluent from manifold 14. The discharge from pump means 18 can then be passed through common conduit 20 to manifold 22, from whence it can be passed through valve $V_{26}$ in conduit 26 for intracirculation back through conduit 4 and mixer $M_1$.

A separated light liquid phase stream which exits separating vessel 1 through conduit 30 is passed through valve $V_{30}$ to conduit 36, and to in-line mixer $M_2$ where said light liquid phase is again mixed with a liquid heavy phase to produce a dispersed liquid phase as provied herein. The dispersed liquid phase effluent from mixer $M_2$ is then passed through conduit 38 to enter spearating vessel 2 wherein said dispersed phase settles and separates into light liquid and heavy liquid phase streams.

A separated heavy liquid phase stream thereafter exits separating vessel 2 through conduit 46 situated at the bottom of separating vessel 2, and thereafter is passed to manifold 14, and then to pump means 18 through common conduit 16 in the manner set forth herein. The discharge from pump means 18 can then be passed through common conduit 20 to manifold 22, and through valve $V_{50}$ in conduit 50 to conduit 36 for intracirculation back through mixer $M_2$.

The heavy liquid phase can also be passed to manifold 22 through valve $V_{26}$ in conduit 26 and into conduit 4 for intercirculation through mixer $M_1$.

A separated light liquid phase stream which thereafter exits separating vessel 2 through conduit 52 situated near the top of separating vessel 2 is passed through valve $V_{52}$ to conduit 58 and then to in-line mixer $M_3$ wherein said light liquid phase is again mixed with a circulating heavy liquid phase to produce a dispersed liquid phase such as described above. The dispersed liquid phase effluent from mixer $M_3$ is then passed through conduit 60 to enter separating vessel 3 wherein said dispersed phase settles and separates into light liquid and heavy liquid phase streams.

The now thrice treated light liquid phase stream exits separating vessel 3 through conduit 62 situated near the top of said vesel for further processing in processes and apparatus not shown.

A separated heavy liquid phase stream next exits separating vessel 3 through conduit 70 situated at the bottom of separating 3 and thereafter is passed to manifold 14, and then to pump means 18 through common conduit 16. Discharge from pump means 18 can then be passed through common conduit 20 to manifold 22 and through valve $V_{74}$ in conduit 74 to conduit 58 for intracirculation back through mixer $M_3$.

As will be now appreciated by those skilled in the art, the separated heavy liquid phase stream from separating vessel 3 can also be conveniently intercirculated to either of in-line mixers 2 or 1, for additional treatment of the counter circulating light liquid phase. For example, either of valves $V_{50}$ or $V_{26}$ can be opened instead of valve $V_{74}$, and the other valves closed, to intercirculate the heavy liquid phase treating stream through manifold 22 and the appropriate conduits to either mixer 2 or 1. In a further aspect, either of the separated heavy liquid phase treating streams in conduits 10, 46 or 70 from the respective separating vessels 1, 2, and 3, can conveniently pass from manifold 14, through common conduit 16, pump means 18 through common conduit 20 and manifold 22 through either of valves $V_{74}$, $V_{50}$ or $V_{26}$ with the other valves closed for intra- or intercirculation through the appropriate conduits and mixers to optimize the process of treating the light liquid phase with the heavy liquid phase. Thus, the heavy liquid phase treating stream can be either intracirculated or intercirculated as many times as desired through each of the seprating vessels before removing said treating stream from the process by opening valve $V_{76}$ in conduit 76.

The heavy liquid phase treating stream can be continuously replenished in the above described process by entry thereto through conduit 78.

Figure 3:
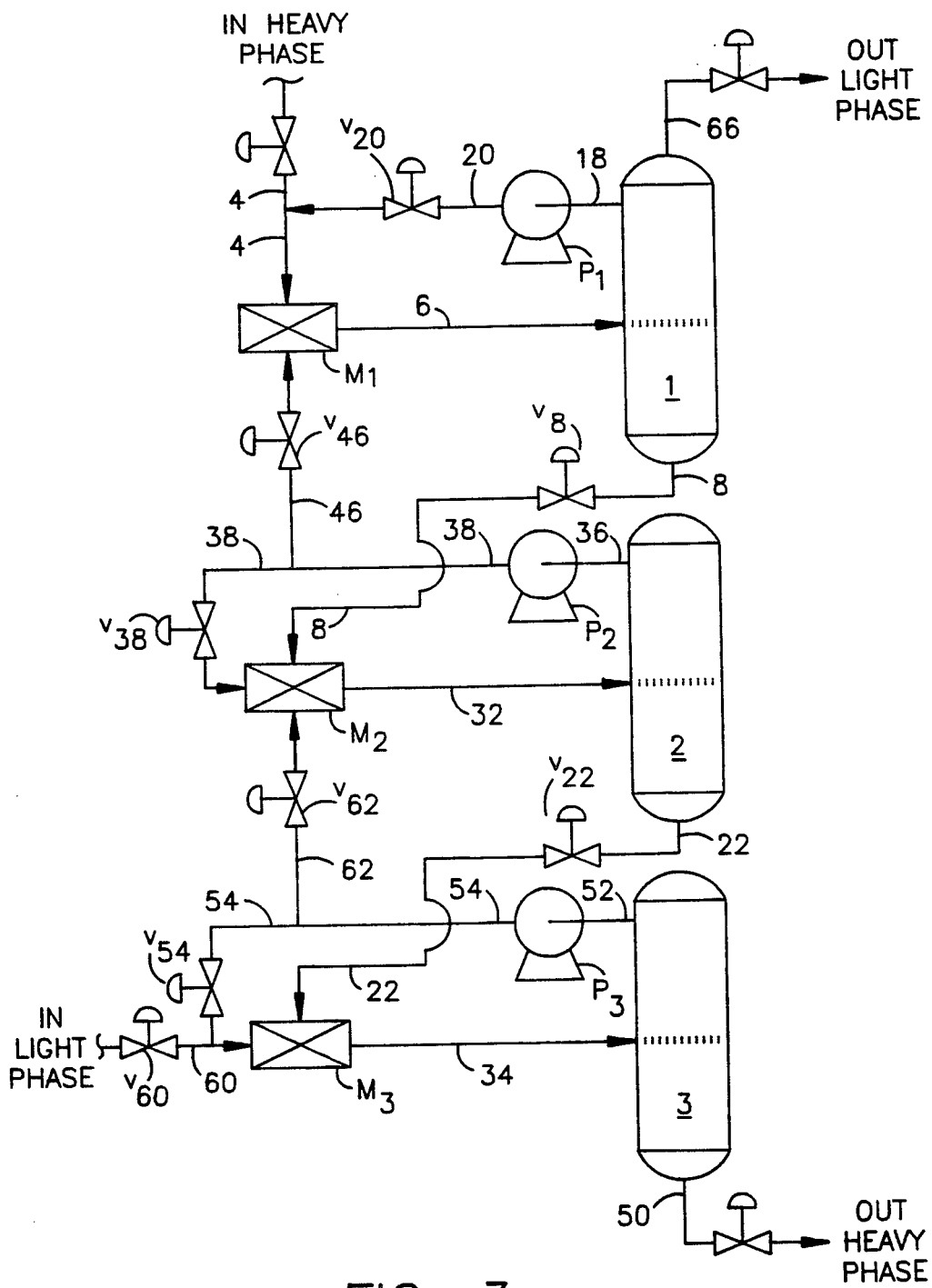
FIG. 3 is a diagrammatic sketch of another additional preferred embodiment of the apparatus and process of the present invention for treating a heavy liquid phase with a light liquid phase wherein the light liquid phase is capable of both intra- and intercirculation between in-line mixing means-separating vessels connected in series for achieving maximum contact of constituents contained in the respective phases.

It is also contemplated treating a heavy liquid phase stream with a light liquid phase stream in an additional embodiment of the apparatus and process of the present invention. Referring now to FIG. 3, a heavy liquid stream to be treated passes through conduit 4 into a first in-line mixer $M_1$, wherein it is mixed with a circulating light liquid treating stream in the manner herein described. The dispersed effluent from mixer $M_1$ is next passed through conduit 6 to enter separating vessel 1 wherein the dispersed effluent is allowed to separate into a once treated heavy liquid phase stream having constituents removed therefrom or reacted and a light liquid phase stream containing constituents originally present in the heavy liquid phase stream or having constituents reacted therewith.

The heavy liquid phase stream exists separating vessel 1 through conduit 8 situated in the bottom portion of separating vessel 1, and passes through valve $V_8$ to in-line mixer $M_2$ where said heavy liquid phase is again mixed with a circulating light liquid treating phase to produce a dispersed liquid phase as provided herein. The dispersed liquid phase effluent from mixer $M_2$ is then passed through conduit 32 to enter separating vessel 2 wherein said dispersed phase settles into a twice treated heavy liquid phase and a light liquid phase increasingly enriched in constituents originally present in the liquid heavy phase or constituents which have reacted with said heavy phase.

The separated light liquid phase exits separating vessel 1 through conduit 18 situated near the top of the vessel and is passed to pump means $P_1$, the discharge of which is passed through conduit 20 and valve $V_{20}$ back to conduit 4 for intracirculation back into mixer $M_1$ for additional treatment of incoming heavy liquid phase to be treated therewith.

The now twice treated heavy liquid phase exits separating vessel 2 through conduit 22 situated in the bottom of said vessel, and passes through valve $V_{22}$ to in-line mixer $M_3$ where said heavy liquid phase once again is mixed with a circulating light liquid treating phase to produce a dispersed liquid phase. The dispersed liquid phase effluent from mixer $M_3$ is then passed through conduit 34 to enter separating vessel 3 wherein said dispersed phase settles into a separated thrice treated heavy liquid phase and a treating light liquid phase.

The separated light liquid phase exits separating vessel 2 through conduit 36 and is passed to pump means $P_2$, the discharge of which is passed through conduit 38 and valve $V_{38}$ for intracirculation back into mixer $M_2$ for additional treatment of incoming heavy liquid phase through conduit 18.

Additionally, the light liquid phase can be directed through conduit 46 and valve $V_{46}$, by closing valve $V_{38}$, and intercirculated therethrough into mixer $M_1$ therein forming a dispersed phase with an incoming fresh heavy liquid stream.

The separated now thrice treated heavy liquid phase exits separting vessel 3 through the bottom portion thereof via conduit 50 for further processing in apparatus not shown. Light liquid phase is removed from said vessel through conduit 52 and is passed to pump means $P_3$ whence the discharge is passed through conduit 54 and valve $V_{54}$ for intracirculation back into mixer $M_3$.

The light liquid phase can also be directed to conduit 62 and through valve $V_{62}$, by closing valve $V_{54}$, and intercirculated through into mixer $M_2$ in similar manner as discussed above.

As can be seen in the apparatus and process of FIG. 3, the light liquid treating phase can thus be intracirculated or intercirculated through mixing means M1, M2 or M3 as desired to optimize extraction or reaction processes.

Expended light liquid phase which leaves the process through conduit 66 situated at the top portion of separating vessel 1 can be continuously replenished by introduction through valve $V_{60}$ into conduit 60.

As illustrated by the above detailed examples of preferred embodiments, the apparatus and process of the present invention provides for a very effective and efficient means to separate or react the constituents of a light liquid hydrocarbon oil phase or heavy liquid aqueous-based phase. By employing in-line mixers capable of producing a dispersed liquid phase of globules preferably between 100 to 500 micrometers in diameter of a light phase dispersed in a heavy liquid aqueous phase, then transferring the dispersed phase to a separating vessel wherein counterflowing conditions are maintained, an extensive total area of contacting surfaces of the different phases is achieved. Such conditions provide a high degree of efficiency in the transfer of selected constituents from each respective liquid phase to the counterflowing liquid phase contacting therewith or in reacting constituents contained in the liquid phases. Due to such efficient contacting and associated intimate mixing of the phases, only a simple separating vessel to receive the effluent therefrom is required which does not depend on multibaffled chambers and the like. This provides for considerable savings in equipment and operating expenses.

In running the two phases as illustrated in the above examples through the apparatus and process of the present invention, it is important not to produce globules much smaller than 100 micrometers, for example, smaller than 50 micrometers, as the dispersed phase becomes difficult to separate when it is passed to the separation vessels.

From that set forth above, it will be readily apparent to those skilled in the art that depending upon the particular light and heavy liquid phases to be admixed then separated in this invention, different phase ratios thereof and globule dimensions in the resulting dispersed phase will be appropriate to achieve the desired mass transfer or desired degree of reaction of selected constituents therebetween. Keeping in mind considerations of separation time, selected constituents to be separated or reacted and the like, the appropriate phase ratios and globule dimensions in the dispersed phase for a particular liquid phase system can be determined without undue experimentation. It is generally preferred in this invention, however, to maintain a globule size in the dispersed phase present in the in-line mixers less than about 500 micrometers, as globules of dimensions much larger generally produce an inadequate amount of contact surfaces for efficient mass transfer or reaction of selected constituents between phases.

Any commercially available in-line mixer capable of producing globules of the desired dimensions is suitable for use in the instant invention. Examples of such mixers include static mixers such as supplied by KOCH Engineering Co., Inc.

As illustrated by the above detailed examples, a heavy liquid aqueous-based caustic phase or light liquid hydrocarbon-based phase can be repeatedly intra- or intercirculated through respective in-line mixers and separating vessels as desired to conveniently optimize a mass transfer of constituents in liquid-liquid contacting or in the reaction of constituents. The process of this invention thus provides for maximum use of a given volume of heavy or light liquid phase for separating or reacting constituents in liquid-liquid contacting of liquids of different specific gravities. Accordingly, due to such increased efficiency less total volume of a liquid heavy phase or light phase is required for use in the separation or reaction processes in the practice of this invention therein producing further savings in capital expenses and operating costs.

The following detailed example is provided to further illustrate the operation of the present invention by way of a particularly preferred embodiment.

EXAMPLE

The apparatus and process of the present invention is particularly well suited for the removal of sulfur compounds from $C_4$ mixtures using caustic solutions, as the difference in specific gravities between $C_4$ hydrocarbons and aqueous caustic solutions is quite large. For example, the specific gravity of a crude mixed $C_4$ stream resulting from olefins cracking operations, and which contains all the $C_4$ isomers in addition to small quantities of $C_3$ and $C_5$ compounds and 5 to 15 parts per million of sulfur-containing impurities, has a specific gravity of about 0.57 to about 0.59. The specific gravity of an appropriate caustic solution is about 1.10 to about 1.20.

The sulfur impurity must be removed from the $C_4$ mixture stream to facilitate further processing and to prevent product contamination. To illustrate the apparatus and process of the present invention in this application, 10,000 kilograms per hour of a $C_4$ hydrocarbon stream having a specific gravity of 0.580 (produced in an olefins unit), and containing 12 parts per million (ppm) (wt) of sulfur is processed in an apparatus and process such as described in FIG. 1 herein with a 10 wt.% caustic solution.

The following conditions in the operation of the process are maintained, as summarized in the following Table.

TABLE

| | |
|---|---|
| Hydrocarbon inlet pressure | 801 kPA (ABS) |
| Hydrocarbon outlet pressure | 634 kPA (ABS) |
| Temperature | 40° C. |
| Caustic circulating rate for each reaction stage (assuming 4 in-line mixing and separation vessel units) | 8.62 cubic meter per hour |

As described in the operation of the apparatus and process illustrated by FIG. 1, the hydrocarbon $C_4$ stream is introduced to an in-line mixer of stage No. 1 of a 4-stage process (4 in-line mixing and separation units) where it is mixed with the circulating caustic stream. A mixer is employed which is specifically designed to generate liquid particles in the range of 100–300 micrometers in dimension. In this size range, intimate contact is achieved resulting in a conversion of greater than 55% of the organic sulfur in each stage of the process. Particle size of the droplets is also large enough such that the droplets separate easily in the separation vessels downstream of the in-line mixers.

Upon separation in separation vessel No. 1 in the first stage, the one treated hydrocarbon flows from the top thereof to mixer No. M2 in the second stage wherein mixing and reaction occur again. The organic sulfur content is further reduced herein by virtue of the reaction occuring in the No. M2 mixer unit. The hydrocarbon stream separates in vessel. No. 2 and then flows to mixer/separator No. M3 in the third stage and finally to mixer for separating in vessel 3 No. M4 (not shown) in the fourth stage, afterwhich the organic sulfur content has been reduced to less than 0.5 ppm.

In each stage, the aqueous caustic solution initially introduced in the in-line mixer No. 4, separates from the light hydrocarbon phase and drops to the bottom of the respective separating vessel where approximately 8.62 cubic meters per hour of caustic is intracirculated through a respective mixer by means of a pump.

Caustic utilization is very small, e.g. about 0.2 kg/hr, thus requiring about 20 liters of caustic solution to be intercirculated to the next lower stage every 24 hours in the following order:

No. 4 to No. 3
No. 3 to No. 2
No. 2 to No. 1.

I claim:

1. An apparatus for effecting liquid-liquid contact in a plurality of stages between two liquid streams having different specific gravities comprising:
    (a) first in-line mixing means for receiving and mixing the liquid streams to form a dispersed liquid phase of globules of one stream dispersed in the other;
    (b) a first separating vessel for receiving the dispersed liquid phase effluent from the first in-line mixing means wherein said effluent separates into a heavier medium in the bottom portion of the first separating vessel and into a lighter medium in the top portion of the first separating vessel;
    (c) a first conduit means for receiving the bottom effluent from the first separating vessel and supplying said bottom effluent to the first in-line mixing means;
    (d) a second in-line mixing means for receiving and mixing the liquid streams to form a dispersed liquid phase of globules of one stream dispersed in the other;
    (e) a second conduit means for receiving the top effluent from the first separating vessel and supplying said top effluent to the second in-line mixing means;
    (f) a second separating vessel for receiving the dispersed liquid phase effluent from the second in-line mixing means wherein said effluent separates into a heavier medium in the bottom portion of the second separating vessel and into a lighter medium in the top portion of the second separating vessel;
    (g) a third conduit means for receiving the bottom effluent from the second separating vessel and supplying said bottom effluent to the first in-line mixing means;
    (h) a fourth conduit means for receiving the bottom effluent from the second separating vessel and supplying and bottom effluent to the first in-line mixing means; where the first in-line mixing means and second in-line mixing means are exteriorly and remotely located to the first separating vessel and second separating vessel.

2. An apparatus for effecting liquid-liquid contact in a plurality of stages between two liquid streams having different specific gravities comprising:
    (a) a first in-line mixing means for receiving and mixing the liquid streams to form a dispersed liquid phase of globules of one stream dispersed in the other;
    (b) a first separating vessel for receiving the dispersed liquid phase effluent from the first in-line mixing means wherein said effluent separates into a heavier medium in the bottom portion of the first separating vessel and into a lighter medium in the top portion of the first separating vessel;
    (c) a first conduit means for receiving the top effluent from the first separating vessel and supplying said top effluent to the first in-line mixing means;

(d) a second in-line mixing means for receiving and mixing the liquid streams to form a dispersed liquid phase of globules of one stream dispersed in the other;

(e) a second conduit means for receiving the bottom effluent from the first separating vessel and supplying the bottom effluent to the second in-line mixing means;

(f) a second separating vessel for receiving the dispersed liquid phase effluent from the second in-line mixing means wherein said effluent separates into a heavier medium in the bottom portion of the second separating vessel and into a lighter medium in the top portion of the second separating vessel;

(g) a third conduit means for receiving the top effluent from the second separating vessel and supplying said top effluent to the second in-line mixing means; and (h) a fourth conduit means for receiving the top effluent from the second separating means and supplying said top effluent to the first in-line mixing means; where the first in-line mixing means and second in-line mixing means are exteriorly and remotely located to the first separating vessel and second separating vessel.

3. An apparatus for effecting fluid-fluid contact in a plurality of stages between two fluid streams having different specific gravities comprising:

(a) a first in-line mixing means for receiving and mixing the fluid streams to form a dispersed fluid phase of globules of one stream dispersed in the other;

(b) a first separating vessel for receiving the dispersed fluid phase effluent form the first in-line mixing means wherein said effluent separates into a heavier medium in the bottom portion of the first separating vessel and into a lighter medium in the top portion of the first separating vessel;

(c) first conduit means for receiving the bottom effluent from the first separating vessel and supplying said bottom effluent to the first in-line mixing means;

(d) a second in-line mixing means for receiving and mixing the fluid streams to form a dispersed fluid phase of globules of one stream dispersed in the other;

(e) a second conduit means for receiving the top effluent form the first separating vessel and supplying said top effluent to the second in-line mixing means;

(f) a second separating vessel for receiving the dispersed fluid phase effluent from the second in-line mixing means wherein said effluent separates into a heavier medium in the bottom portion of the second separating vessel and into a lighter medium in the top portion of the second separating vessel;

(g) a third conduit means for receiving the bottom effluent from the second separating vessel and supplying said bottom effluent to the second in-line mixing means;

(h) a fourth conduit means for receiving the bottom effluent from the second separating vessel and supplying said bottom effluent to the first in-line mixing means; wherein the first in-line mixing means and second in-line mixing means are exteriorly and remotely located from the first separating vessel and second separating vessel.

4. An apparatus for effecting fluid-fluid contact in a plurality of stages between two fluid streams having different specific gravities comprising:

(a) a first in-line mixing means for receiving and mixing the fluid streams to form a dispersed fluid phase of globules of one stream dispersed in the other;

(b) a first separating vessel for receiving the dispersed fluid phase effluent from the first in-line mixing means wherein said effluent separates into a heavier medium in the bottom portion of the first separating vessel and into a lighter medium in the top portion of the first separating vessel;

(c) a first conduit means for receiving the top effluent from the first separating vessel and supplying said top effluent to the first in-line mixing means;

(d) a second in-line mixing means for receiving and mixing the fluid streams to form a dispersed fluid phase of globules of one stream dispersed in the other;

(e) a second conduit means for receiving the bottom effluent from the first separating vessel and supplying the bottom effluent tot he second in-line mixing means;

(f) a second separating vessel for receiving the dispersed fluid phase effluent from the second in-line mixing means wherein said effluent separates into a heavier medium in the bottom portion of the second separating vessel and into a lighter medium in the top portion of the second separating vessel;

(g) a third conduit means for receiving the top effluent from the second separating means and supplying said top effluent to the second in-line mixing means; and (h) a fourth conduit means for receiving the top effluent from the second separating means and supplying said top effluent to the first in-line mixing means; wherein the first in-line mixing means and the second in-line mixing means are exteriorly and remotely located from the first separating vessel and second separating vessel.

5. An apparatus for effecting fluid-fluid contact in a plurality of stages between two fluid streams having different specific gravities comprising:

(a) a first in-line mixing means for receiving and mixing the fluid streams to form a dispersed fluid phase of globules of one stream in the other;

(b) a first separating vessel for receiving the dispersed fluid phase effluent from the first in-line mixing means wherein said effluent separates into a heavier medium in the bottom portion of the first separating vessel and into a lighter medium in the top portion of said vessel;

(c) a first conduit means for receiving the bottom effluent from the first separating vessel and supplying said bottom effluent to the first in-line mixing means;

(d) a second in-line mixing means for receiving and mixing the fluid streams to form a dispersed fluid phase of globules of one stream dispersed in the other;

(e) a second conduit means for receiving the top effluent from the first separating vessel and supplying said top effluent to the second in-line mixing means;

(f) a second separating vessel for receiving the dispersed fluid phase effluent from the second in-line mixing means wherein said effluent separates into a heavier medium in the bottom portion of the second separating vessel and into a lighter medium in the top portion of said vessel;

(g) a third conduit means for receiving the bottom effluent from the second separating vessel and supplying said bottom effluent to the second in-line mixing means;

(h) a fourth conduit means for receiving the bottom effluent from the second separating vessel and supplying said bottom effluent to the first in-line mixing means;

(i) a third in-line mixing means for receiving and mixing the fluid streams to form a dispersed fluid phase of globules of one stream dispersed in the other;

(j) a fifth conduit means for receiving the top effluent from the second separating vessel and supplying said top effluent to the third in-line mixing means;

(k) a third separating vessel for receiving the dispersed fluid phase effluent from the third in-line mixing means wherein said effluent separates into a heavier medium in the bottom portion of the third separating vessel and into a lighter medium in the top portion of said third vessel; and (l) a sixth conduit means for receiving the bottom effluent from the third separating vessel and supplying said bottom effluent to the first in-line mixing means.

6. In an apparatus for effecting fluid-fluid contact in a plurality of stages between two fluid streams having different specific gravities comprising:

(a) a first in-line mixing means for receiving and mixing fluid streams to form a dispersed fluid phase of globules of one stream dispersed in the other;

(b) a first separating vessel for receiving the dispersed fluid phase effluent wherein said effluent separates into a heavier medium in the bottom portion of the first separating vessel and into a lighter medium in the top portion of said vessel;

(c) a second in-line mixing means for receiving and mixing the fluid streams to form a dispersed fluid phase of globules of one stream dispersed in the other;

(d) a first conduit means for receiving the top effluent from the first separating vessel and supplying said top effluent to the second in-line mixing means;

(e) a second separating vessel for receiving the dispersed fluid phase effluent from the second in-line mixing means wherein said effluent separates into a heavier medium in the bottom portion of the second separating vessel and into a lighter medium in the top portion of said vessel;

(f) a second and third conduit means for receiving the bottom effluents from the first and second separating vessels, respectively, and supplying said bottom effluents to a manifold means;

(g) a fourth conduit means for receiving and supplying the bottom effluents from said manifold means in (f) to the first or second in-line mixing means; and (h) a fifth conduit means for receiving the top effluent from the second separating vessel.

7. An apparatus for effecting fluid-fluid contact in a plurality of stages between two fluid streams having different specific gravities comprising:

(a) a first in-line mixing means for receiving and mixing the fluid streams to form a dispersed fluid phase of globules of one stream dispersed in the other;

(b) a first separating vessel for receiving the dispersed fluid phase effluent from the first in-line mixing means wherein said effluent separates into a heavier medium in the bottom portion of the first separating vessel and into a lighter medium in the top portion of said vessel;

(c) a first conduit means for receiving the top effluent from the first separating vessel and supplying said top effluent to the first in-line mixing means;

(d) a second in-line mixing means for receiving and mixing the fluid streams to form a dispersed fluid phase of globules of one stream in the other;

(e) a second conduit means for receiving the bottom effluent from the first separating vessel and supplying said bottom effluent to the second in-line mixing means;

(f) a second separating vessel for receiving the dispersed fluid phase effluent from the second in-line mixing means wherein said effluent separates into a heavier medium in the bottom portion of the second separating vessel and into a lighter medium in the top portion of said vessel;

(g) a third conduit means for receiving the top effluent from the second separating vessel and supplying said top effluent to the second in-line mixing means;

(h) a fourth conduit means for receiving the top effluent from the second separating vessel and supplying said top effluent to the first in-line mixing means;

(i) a third in-line mixing means for receiving and mixing the fluid streams to form a dispersed fluid phase of globules of one stream in the other;

(j) a fifth conduit means for receiving the bottom effluent from the second separating vessel and supplying said bottom effluent to the third in-line mixing means;

(k) a third separating vessel for receiving the dispersed fluid phase effluent from the third in-line mixing means wherein said effluent separates into a heavier medium in the bottom portion of the third separating vessel and into a lighter medium in the top portion of said vessel; and (l) a sixth conduit means for receiving the top effluent form the third separating vessel and supplying said top effluent to the first in-line mixing means.

8. A process for effecting fluid-fluid contact in a plurality of stages between two fluid streams having different specific gravities comprising:

(a) mixing a first light medium with a circulating heavy medium in a first in-line mixer to form a first mixed effluent;

(b) separating said first mixed effluent into a first heavy medium and a second lighter medium;

(c) mixing the second light medium with a circulating heavy medium in a second in-lien mixer to form a second mixed effluent;

(d) recirculating said first heavy medium to said first in-line mixer;

(e) separating said second mixed effluent into a second heavy medium and a third light medium;

(f) recirculating a first portion of said second heavy medium to said first in-line mixer and a second portion of said second heavy medium to said second in-line mixer;

(g) mixing said third light medium with a circulating heavy medium in a third in-line mixer to form a third mixed effluent;

(g) separating said third mixed effluent into a third heavy medium and a fourth light medium; and (i) recirculating a portion of said third heavy medium to said first in-line mixer.

9. A process for effecting fluid-fluid contact in a plurality of stages between two fluid streams having different specific gravities comprising:

(a) mixing a first heavy medium with a circulating light medium in a first in-line mixer to form a first mixed effluent;

(b) separating said first mixed effluent into a first light medium and a second heavier medium;

(c) mixing the second heavy medium with a circulating light medium in a second in-line mixer to form a second mixed effluent;

(d) recirculating said first light medium to said first in-line mixer;

(e) separating said second mixed effluent into a second light medium and a third heavy medium;

(f) recirculating a first portion of said second light medium to said first in-line mixer and a second portion of said second light medium to said second in-line mixer;

(g) mixing said third heavy medium with a recirculating light medium in a third in-line mixer to form a third mixed effluent;

(h) separating said third mixed effluent into a third light medium and a fourth heavy medium;

(i) recirculating a portion of said third light medium to said first in-line mixer.

* * * * *